United States Patent [19]

Aimonoya

[11] Patent Number: 5,047,858
[45] Date of Patent: Sep. 10, 1991

[54] MULTIPLE IMAGE PROCESSING AND DISPLAY SYSTEM
[75] Inventor: Izumi Aimonoya, Yokohama, Japan
[73] Assignee: Kabushiki Kaisha Toshiba, Kawasaki, Japan
[21] Appl. No.: 330,614
[22] Filed: Mar. 30, 1989
[30] Foreign Application Priority Data
Mar. 31, 1988 [JP] Japan .................. 63-80026
[51] Int. Cl.⁵ .............................................. H04N 5/45
[52] U.S. Cl. ...................................... 358/183; 358/160
[58] Field of Search .................. 358/183, 22, 160, 108, 358/41

[56] References Cited
U.S. PATENT DOCUMENTS
4,656,515 4/1987 Christopher ................... 358/22 X
4,729,028 3/1988 Micic et al. .................... 358/183

Primary Examiner—James J. Groody
Assistant Examiner—Mark R. Powell
Attorney, Agent, or Firm—Foley & Lardner

[57] ABSTRACT

A method of and apparatus for displaying a plurality of sub-frame images picked up with solid state image pickup devices on the screen of a single television monitor. In reading image pickup signals from a plurality of solid state image pickup devices, the image pickup signals are added and read out for a plurality of lines, and in the horizontal direction read out within a period of one optional number-th of the effective horizontal scan period, at readout timings suitable for each solid state image pickup device in the vertical and horizontal directions.

8 Claims, 10 Drawing Sheets

FIG.4 (a) DRIVE TIMINGS FOR IMAGE PICKUP DEVICE 1 & 2

FIG.4 (b) DRIVE TIMINGS FOR IMAGE PICKUP DEVICE 3 & 4

FIG. 5

FIG. 6 (a) LINE-SHIFT OF THIS INVENTION

FIG. 6 (b) LINE-SHIFT OF RELATED BACKGROUND ART

FIG. 7 (a) HORIZONTAL DRIVE TIMINGS FOR IMAGE PICKUP DEVICES 1 & 3 OF THIS INVENTION

FIG. 7 (b) HORIZONTAL DRIVE TIMINGS FOR IMAGE PICKUP DEVICES 2 & 4 OF THIS INVENTION

FIG. 7 (c) HORIZONTAL DRIVE TIMINGS FOR IMAGE PICKUP DEVICES OF RELATED BACKGROUND ART

MULTIPLE IMAGE PROCESSING AND DISPLAY SYSTEM

FIELD OF THE INVENTION

The present invention relates to a method of displaying sub-frame images for a television system (TV system), and apparatus used in practicing the same. More particularly, the present invention relates to a method and apparatus for a TV system for displaying on the screen of a single TV monitor a plurality of sub-frame images picked up with a plurality of TV cameras and reduced in size at the same time.

BACKGROUND OF THE INVENTION

Figure 9:
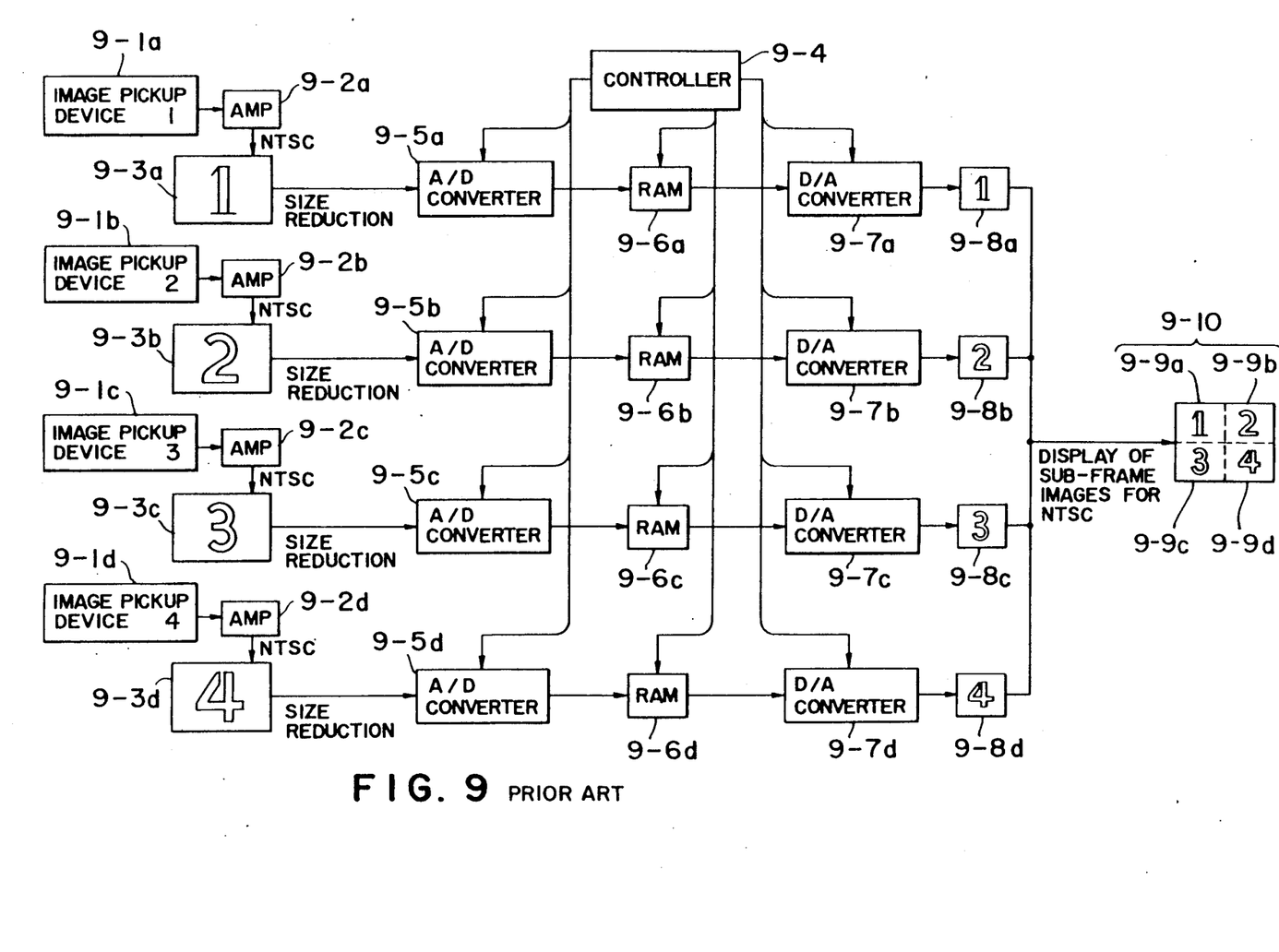
FIG. 9 is a block diagram showing the principle of displaying four sub-frame images on an NTSC system monochrome television according to the related background art of this invention.

FIG. 9 is a block diagram that illustrates the principle of displaying four sub-frame images on an NTSC TV system according to the related background art of this invention. The method for reducing the size of the four sub-frame images picked up with four TV cameras and properly aligning them on a single TV monitor will be described, referring to FIG. 9.

In FIG. 9, the images of numerals "1" to "4" are picked up with four TV cameras (image pickup devices) and divisionally displayed on a single TV monitor at the same time, by way of example. Specifically, data of the image "1" picked up with an image pickup device 9-1a are amplified by an amplifier 9-2a and thereafter output as an image 9-3a matching the NTSC system. The output image 9-3a is reduced in size in the manner to be described later to obtain image data. The image data are subjected to A/D conversion by an A/D converter 9-5a and stored in a RAM 9-6a under control of a controller 9-4. The image data stored in RAM 9-6a are read out therefrom under control of the controller 9-4 and subjected to D/A conversion at a D/A converter. After this D/A conversion, the sampled and reduced-in-size image 9-8a is obtained.

The above operations are also applied to the images picked up with the other image pickup devices 9-1b to 9-1d, and so the description therefor is not repeated, and similar reference numbers are used (a being replaced with b to d) for identical components.

The four reduced images 9-8a to 9-8d obtained as above are subjected to position alignment to be later described in detail and displayed as the image 9-10 of four sub-frame images 9-9a to 9-9d on the monitor screen of an NTSC system monochrome TV monitor.

Next, the method of reducing the size of the four images and displaying them on the monitor screen at predetermined locations will be described.

An image on a TV monitor is displayed by scanning the electron beam at a constant speed. Therefore, in order to display a size-reduced sub-frame image, the time axis should be changed beforehand. For such time axis changes, it becomes necessary to provide a storage device for temporarily storing the amount of information corresponding to one frame. The information is written to the storage at a slow sampling rate, and sequentially read out therefrom at a speed higher than the sampling rate.

Figure 8A:
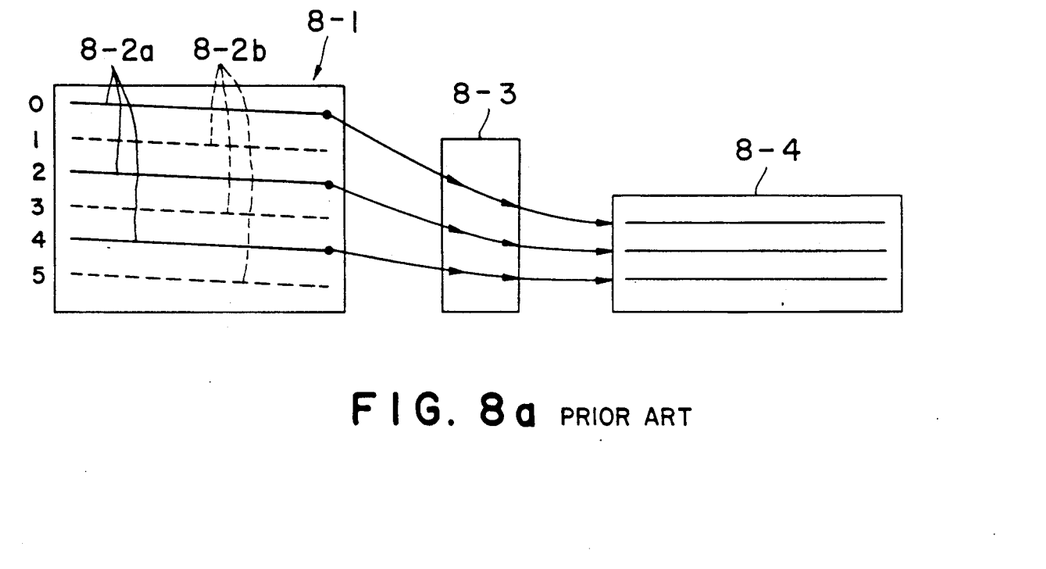
FIGS. 8a and 8b illustrate the principle of reducing the size of an image by ½ both in the vertical and horizontal directions according to the related background art of this invention.

Such an operation will be described with reference to FIGS. 8a and 8b. FIG. 8a illustrates the principle of reducing the size of an image by ½ in the vertical direction. As shown in FIG. 8a, to reduce the vertical direction by ½, the scan lines 8-2a, 8-2b of an image 8-1 picked up with an image pickup device are thinned every second scan line. The scan lines 8-2a are sampled, whereas the scan lines 8-2b are thinned or removed. Data on the sampled scan lines 8-2a are temporarily stored in a storage device (RAM) 8-3.

Next, the data are read out sequentially from RAM 8-3 at an ordinary readout speed so that an image 8-4 having a shorter time axis length in the vertical direction shown in FIG. 8a can be obtained.

Figure 8B:
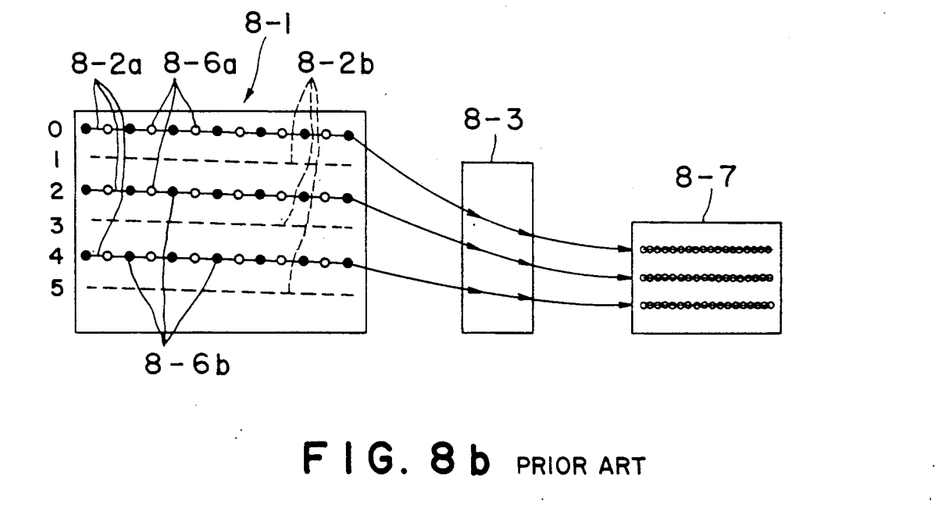

FIG. 8b shows the principle of reducing the size of an image by ½ in both the vertical and horizontal directions. As shown in FIG. 8b, in order to reduce the size of an image by ½ in both the vertical and horizontal directions, the scan lines 8-2a and 8-2b of an image 8-1 picked up with an image pickup device are sampled while thinning every second scan line, in a similar manner to the case shown in FIG. 8a. Not all pixels on the sampled scan lines 8-2a are sampled, but the pixels are thinned every second pixel. The pixels 8-6a are sampled, whereas the pixels 8-6b are thinned or removed. The sampled pixels 8-6a are stored in RAM 8-3. Next, the sampled data are read out from RAM 8-3 at the ordinary readout speed. As a result, an image (sub-frame image) 8-7 with its size reduced by ½ both in the vertical and horizontal directions, i.e., with ¼ of the original area, is obtained as shown in FIG. 8b.

The reduced image 8-7 thus obtained corresponds to each of the reduced images 9-8a to 9-8b shown in FIG. 9. The reduced images 9-8a to 9-8b are displayed on the monitor screen shown in FIG. 9 in the following manner. Namely, at the time when the scan line of the monitor screen comes to the position where the reduced-size image 9-9a is to be displayed, the data of the reduced image 9-8a stored in RAM 9-6a are read out and displayed. Similarly, at the time when the scan line of the monitor screen comes to the positions where the reduced-size images 9-9b to 9-9d are to be displayed, the data of the reduced-size images 9-9b to 9-9d are read out and displayed. In the above manner, the image 9-10 having four sub-frame images 9-9a to 9-9d can be obtained as shown in FIG. 9.

The above technique has the following problems.
(1) The horizontal resolution lowers by (resolution of an image pickup device)/(number of sub-frames in the horizontal direction). For example, in the case of the above-described four sub-frames, pixels in the horizontal lines are sampled while every second pixel is thinned. Therefore, the horizontal resolution is lowered by ½.
(2) A/D converters and D/A converters are used for image data processing. These circuit components are required to be operable in the high frequency range. Therefore, highly sophisticated technology is required. In addition, the circuit becomes bulky which makes it impossible to miniaturize the overall system. Furthermore, such circuit components are very expensive, and result in the high cost of the overall system.

SUMMARY OF THE INVENTION

It is an object of the present invention to provide a method of displaying sub-frame images for a TV system and the apparatus used in practicing the same, capable of retaining a high resolution in the horizontal direction while making the apparatus compact and low in cost.

According to the present invention, a method of displaying sub-frame images for a television system wherein image pickup signals are read out from a plurality of solid image pickup devices using vertical direction signal readout means and horizontal direction signal readout means, and a plurality of images picked up with the plurality of solid state image pickup devices are reduced in size by processing the image pickup signals to display the reduced images on the screen of a single television monitor at the same time, comprises the steps of:

adding up and reading out said image signals of a predetermined number n of lines by using said vertical direction signal readout means, where is a number larger than or equal to 1, and if m is 1, n is a number larger than 1 and not inclusive of 1;

reading said image signals at a high speed within a period of one m-th of an effective horizontal scan period, by using said horizontal direction signal readout means, where m is a number larger than or equal to 1, and if n is 1, m is a number larger than 1 and not inclusive of 1; and determining the start timings of reading said image pickup signals from each of said solid state image pickup devices in the vertical and horizontal directions, by using timing determining means, depending upon at which position on said display screen each said image picked up with each said solid state image pickup device is to be displayed.

In the apparatus according to the present invention for displaying sub-frame images for a television system, image pickup signals are read out from a plurality of solid image pickup devices using vertical direction signal readout means and horizontal direction signal readout means, and a plurality of images picked up with the plurality of solid state image pickup devices are reduced in size by processing the image pickup signals to display the reduced images on the screen of a single television monitor at the same time, wherein:

said vertical direction signal readout means is constructed so as to add up and read out said image signals of a predetermined number n of lines, where n is a number larger than or equal to 1, and if m is 1, n is a number larger than 1 and not inclusive of 1;

said horizontal direction image readout means is constructed so as to read said image signals at a high speed within a period of one m-th of an effective horizontal scan period, where m is a number larger than or equal to 1, and if n is 1, m is a number larger than 1 and not inclusive of 1; and timing determining means is provided for determining the start timings for reading said image pickup signals from each of said solid state image pickup devices in the vertical and horizontal directions, depending upon at which position on said display screen each said image pick up with each said solid state image pickup device is to be displayed.

Image pickup signals are read out from each of a plurality of solid state image pickup devices in the following manner. Image signals of a predetermined number n of lines in the vertical direction are added up and read out by using vertical direction signal readout means. The height of a sub-frame image is redeuced if n is larger than 1. Image signals are read in the horizontal direction by using horizontal direction signal readout means, within a period of one optional number-th of the effective horizontal scan period, i.e., at a higher speed than that for reading during all the effective horizontal scan period if m is larger than 1. Therefore, the width of a sub-frame image is reduced if m is larger than 1. The start timings for reading image signals in the vertical and horizontal directions are determined for each solid state image pickup device by using timing determination means. Depending upon the readout start timings, the position on the display screen of a TV receiver is determined for each image picked up with a solid state image pickup device. A plurality of sub-frame images picked up with solid state image pickup devices and reduced in size are displayed on the display screen at the same time.

According to the present invention, instead of sampling pixels aligned in the horizontal direction of a solid state image pickup device, the horizontal readout is carried out at a high speed. Therefore, the horizontal resolution of a sub-frame image can be maintained high. Furthermore, A/D converters, RAMs and D/A converters required to have broad bandwidths are not needed, making the overall system compact and not expensive.

DESCRIPTION OF THE PREFERRED EMBODIMENT

Figure 2:
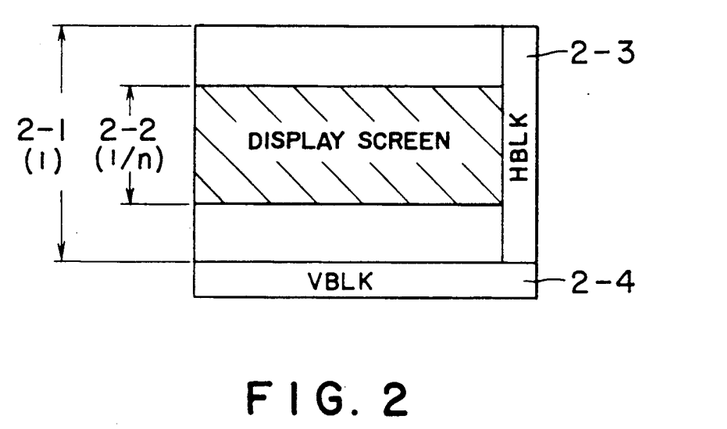
FIGS. 2 and 3 illustrate the principle of reducing the size of an image in the vertical and horizontal directions according to the embodiment of this invention.
Figure 3:
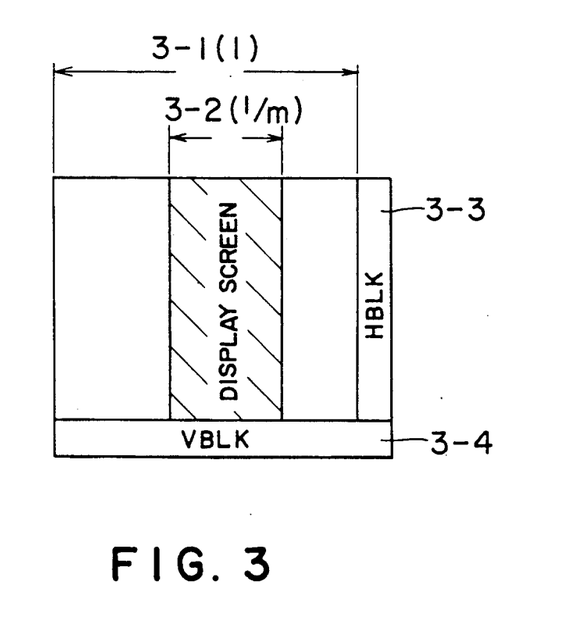

An embodiment of the present invention will be described with reference to FIGS. 2 and 3 showing the principle of reducing the size of an image according to this invention, while comparing the embodiment with the related background art.

Figure 10:
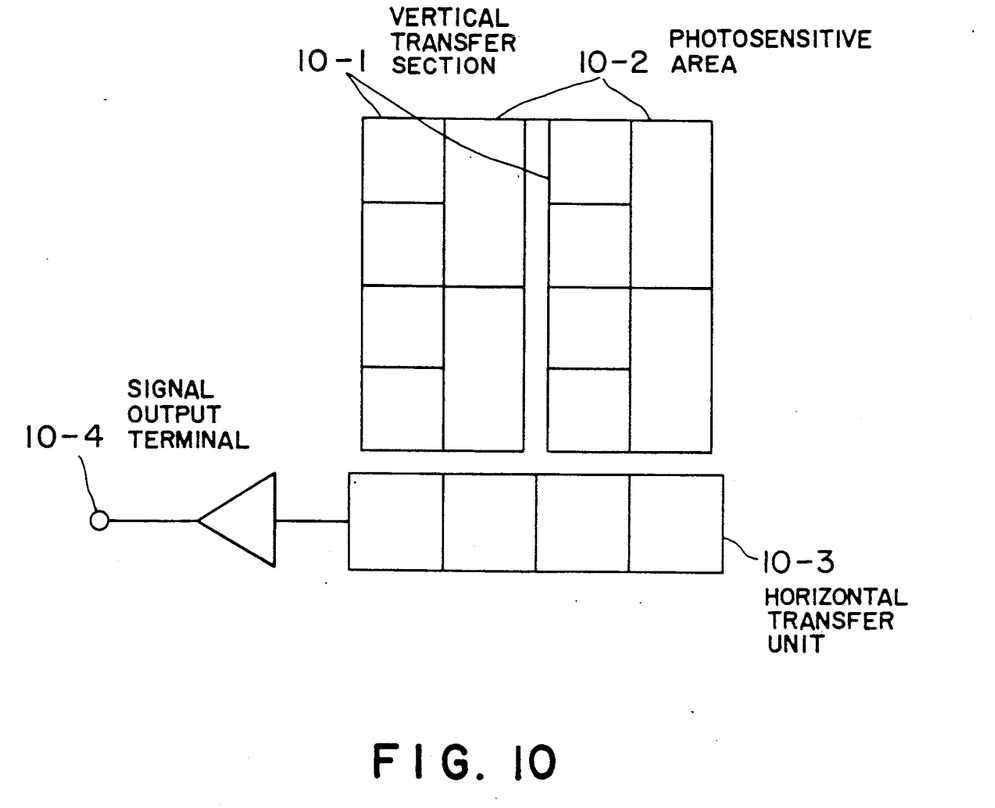
FIG. 10 shows the structure of a solid state image pickup device

As shown in FIG. 10, a solid state image pickup device is constructed of photosensitive areas 10-2 for photoelectrically converting light into electric charges, vertical transfer units 10-1 for transferring charges in the vertical direction (hereinafter called "line-shift"), and a horizontal transfer unit 10-3 for transferring charges sent from the vertical transfer areas 10-1.

Charges photoelectrically converted at the photosensitive areas 10-2 are read and line-shifted into the vertical transfer units 10-1 and thereafter, transferred to the horizontal transfer unit 10-3. The charges are then horizontally transferred and output as an output signal from a signal output terminal 10-4.

According to the related background art of this invention, in reading signals from the solid state image pickup device, the signals of one line are read with line-shift, during one horizontal blanking period (HBLK period) 2-3 shown in FIG. 2. Such readout operation is repeated during the effective vertical scan period 2-1 to read all the lines. The height of an image read in the above manner corresponds to the effective vertical scan period 2-1.

In contrast with the above, according to the embodiment of this invention, signals for n [n is a number larger than or equal to 1. If m (to be described later) is 1, n is a number larger than 1 and not inclusive of 1] lines are added and line-shifted during one horizontal blanking period. Therefore, all the line-shifts are completed during 1/n of the effective vertical scan period 2-1. The height of an image read in the above manner corresponds to (1/n of the effective vertical scan period 2-1) 2-2. Thus, the height of an image displayed on the screen is reduced by 1/n.

According to the above related background art, in reading signals from the solid state image pickup device, all the effective pixels are read during the effective horizontal scan period 3-1 as shown in FIG. 3. The width of an image read in the above manner corresponds to the effective horizontal scan period 3-1.

In contrast with the above, according to the embodiment of this invention, the horizontal readout period is 1/m of the effective horizontal scan period, where m is a number larger than 1 or equal to 1. If n is 1, m is a number larger than 1 and not inclusive of 1. Therefore, the horizontal readout speed becomes m times readout speed of the related background art. In other words, the horizontal readout is completed during 1/m of the effective horizontal scan period 3-3. The width of an image read in the above manner corresponds to (1/m of the effective horizontal scan period 3-1) 3-2, i.e., the width of an image displayed on the screen is reduced by 1/m.

The signal output period from the solid image pickup device is reduced in the vertical and horizontal directions in the above manner so that the height and width of an image can be reduced. A plurality of images reduced in size can be displayed divisionally and concurrently on the screen of a monitor.

The embodiment of this invention will be described in more detail with reference to FIG. 1 which illustrates the principle of displaying four sub-frame images on an NTSC system monochrome TV monitor.

As described previously, image pickup signals for n lines are added and read out from the solid state image pickup device during the horizontal blanking period so that the height of an image is reduced by 1/n. A horizontal readout speed multiplied by m is used so that the width of an image is reduced by 1/m. As a result, in order to reduce the height of an image by ½, image pickup signals for two lines are added and read out. Similarly, in order to reduce the width of an image by ½, a horizontal readout speed that is twice the speed used in the related background art, is used.

Figure 11A:
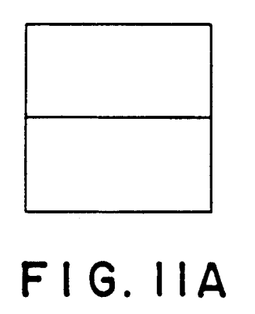
FIG. 11A to FIG. 11F show examples of sub-frames on a TV screen.
Figure 11B:
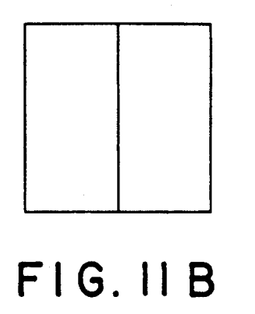
Figure 11C:
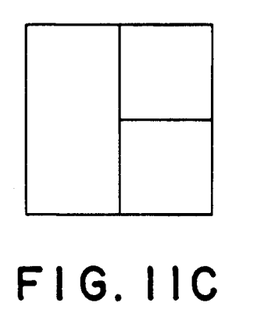
Figure 11D:
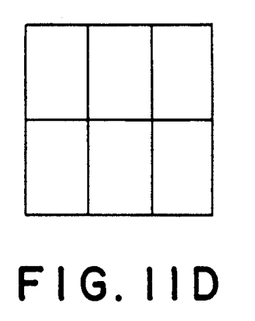
Figure 11E:
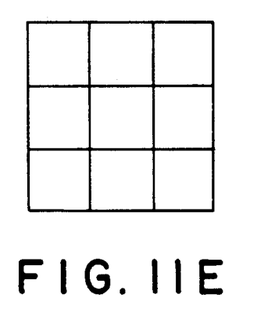
Figure 11F:
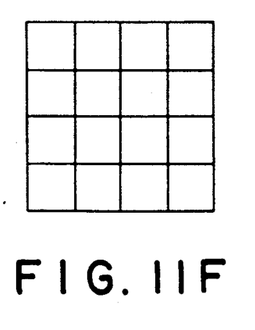

FIGS. 11A to 11F show examples of sub-frames on a TV screen with various combinations of values of n and m. FIG. 11A is the screen for when n=2 and m=1, FIG. 11B for n=1 and m=2, FIG. 11C for n=1 and m=2 for the left side of the screen, and n=2 and m=2 for the right side, FIG. 11D for n=2 and m=3, FIG. 11E for n=3 and m=3, and FIG. 11F for n=4 and m=4.

Figure 1:
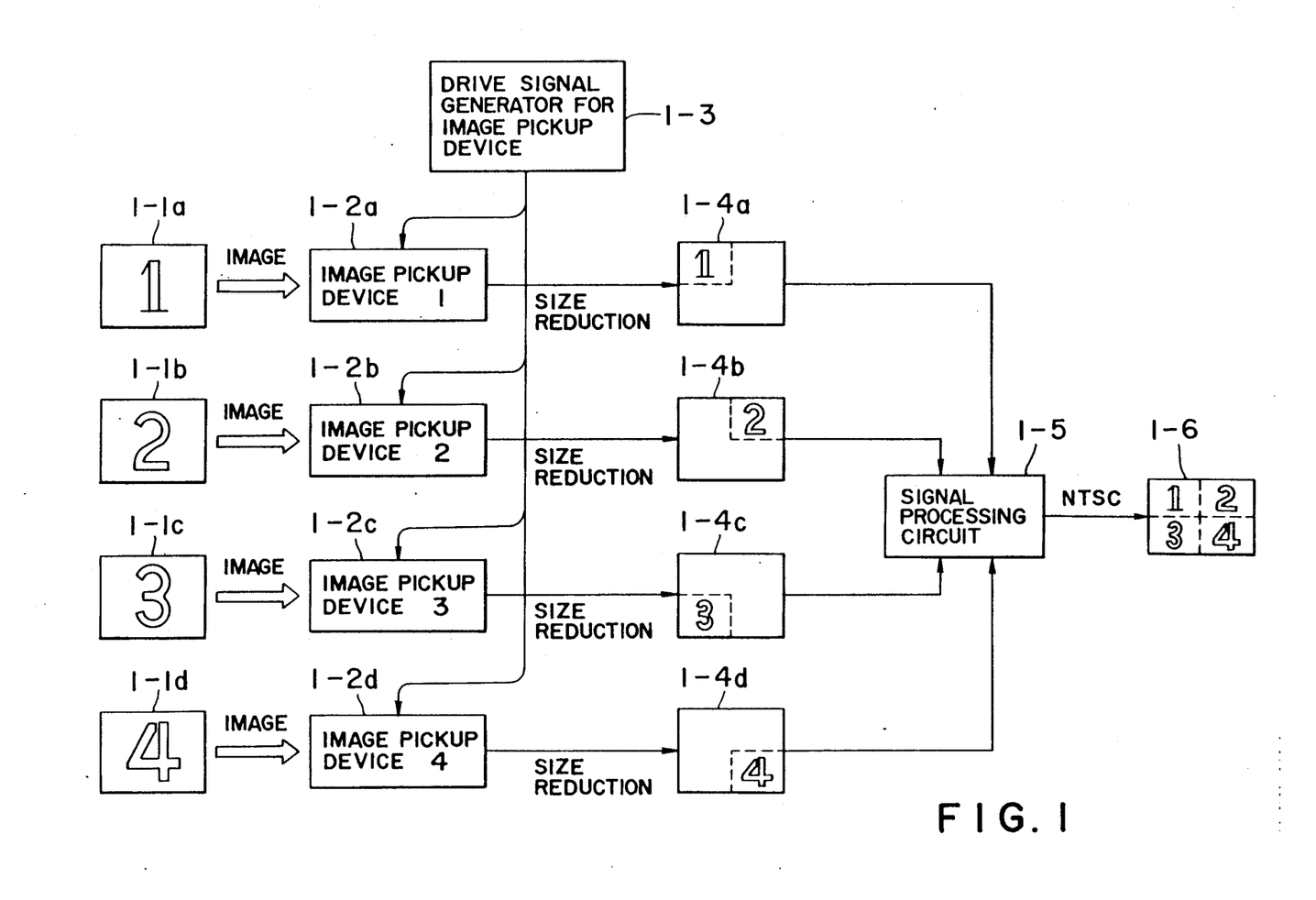
FIG. 1 is a block diagram showing the principle of displaying four sub-frame images on an NTSC system monochrome television according to an embodiment of this invention.

Referring to FIG. 1, numerals "1" to "4" indicated at 1-1a to 1-1d, are the objects for image pick-up with solid state image pickup devices 1-2a to 1-2d. Numerals "1" to "4" are indicated at a size similar to that of the background art. Two lines of image pickup signals of the object images 1-1a to 1-1d picked up with the solid state image pickup devices 1-2a to 1-2d, are added up in the vertical direction and read out, and in the horizontal direction read out at a horizontal readout speed twice as fast, respectively and in synchronization with drive signals from a drive signal generator 1-3. Using proper readout timings, i.e., proper drive signal timings for each of the solid state image pickup devices 1-2a to 1-2d, signals for size reduced images 1-4a to 1-4d to be aligned at predetermined positions on the screen can be obtained. The signals are processed by a signal processing circuit 1-5 and displayed as an image 1-6 having four sub-frame reduced-size images on the screen of an NTSC system monochrome TV monitor.

Next, the drive signals from the drive signal generator 1-3 will be described in detail while comparing the drive signals with those used in the above-related background art.

Figure 4A:
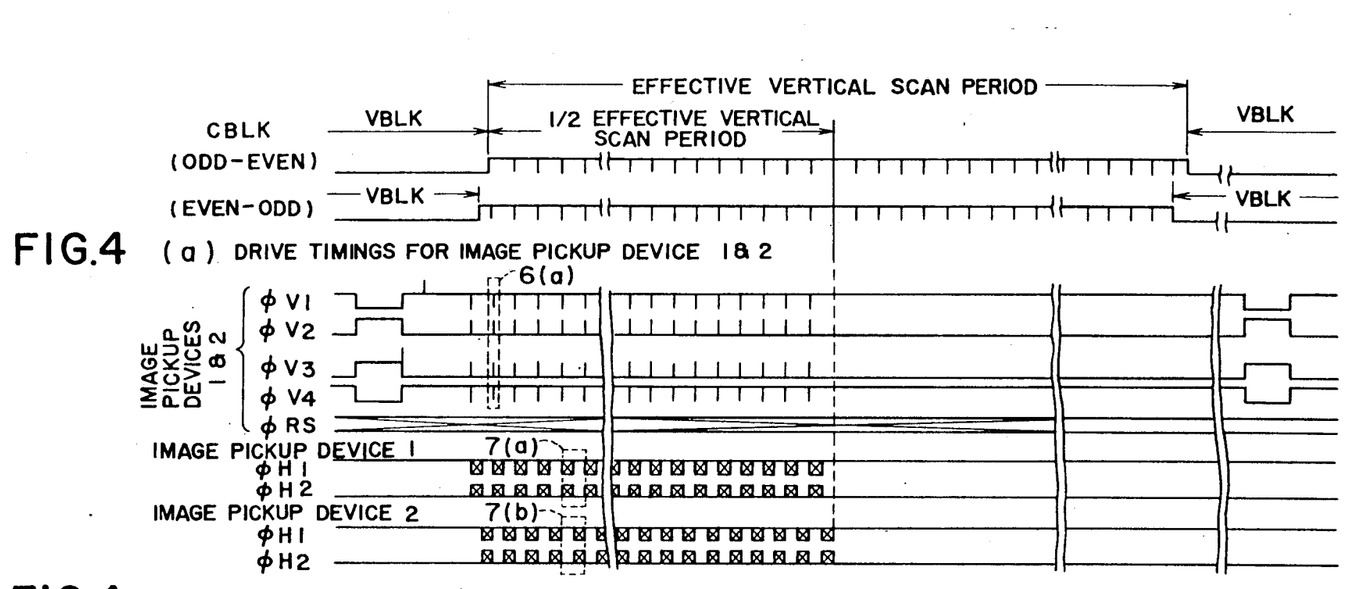
FIGS. 4a, 4b, 5 are timing charts showing the drive timings of a solid state image pickup device, respectively according to the embodiment of this invention and according to the related background art of this invention.
Figure 4B:
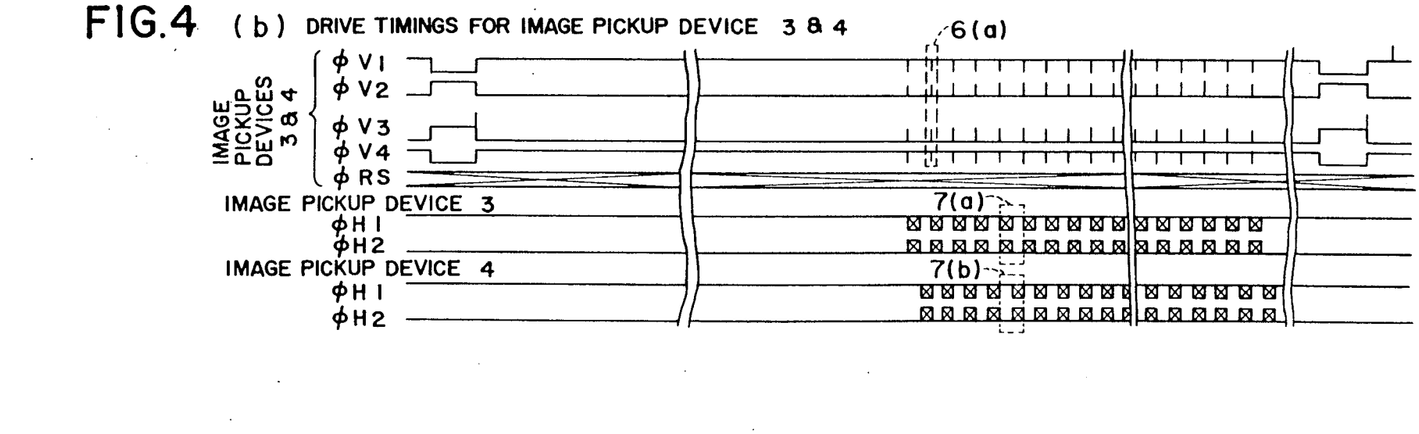
Figure 5:
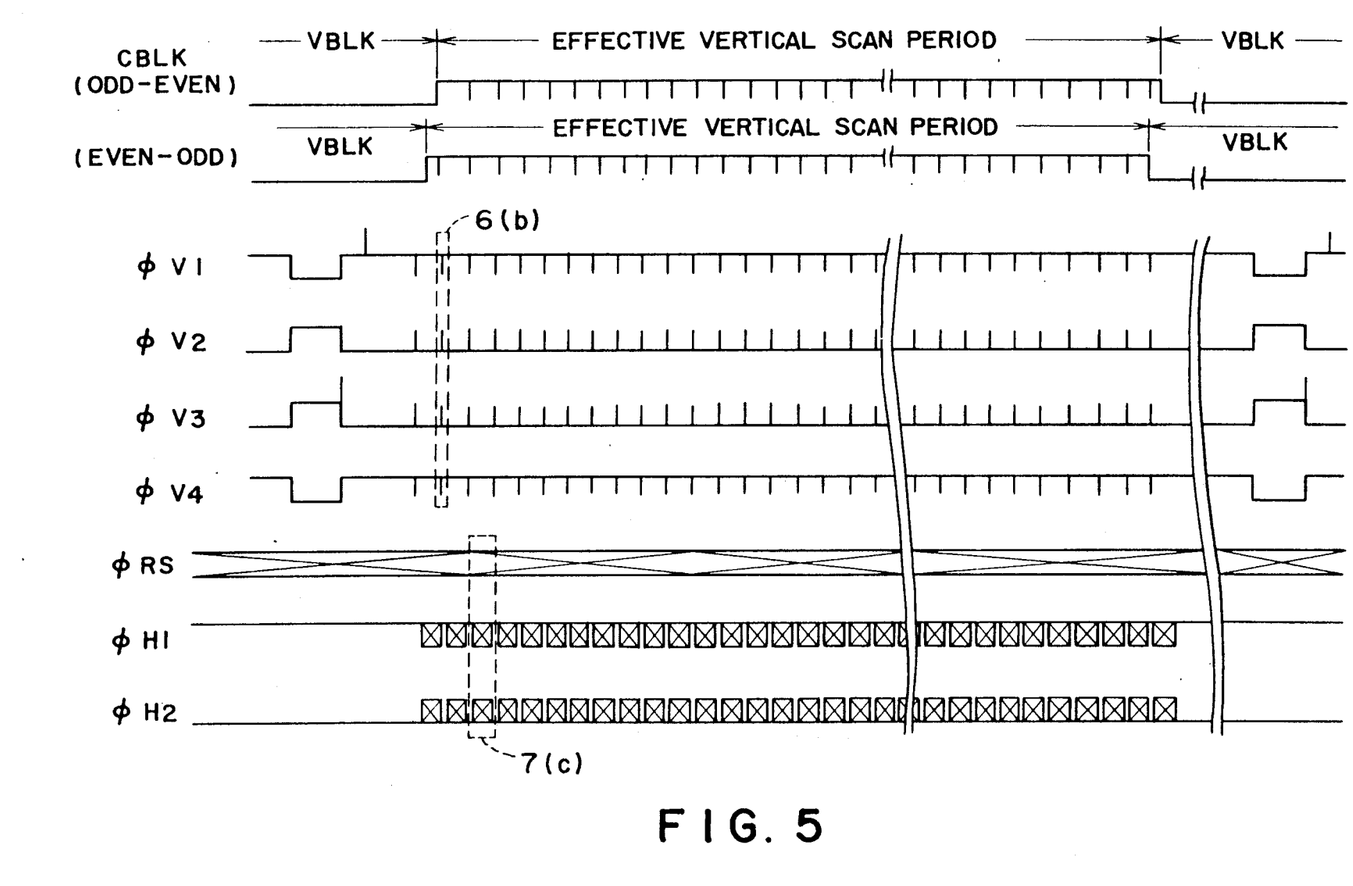

FIGS. 4 and 5 are timing charts showing the drive timings of the solid state image pickup device, according to the embodiment of this invention and the above related background art. In the figures, $\Phi V1$ to $\Phi V4$ represent a vertical drive pulse, and $\Phi RS$, $\Phi H1$ and $\Phi H2$ represent a horizontal drive pulse. As seen from FIG. 5, according to the above background art, all the image pickup devices are driven at the same timings. In contrast with this, according to the embodiment of this invention, as seen from FIG. 4, the drive start timings are shifted depending upon the solid state image pickup devices (1 to 4) 1-2a to 1-2d, i.e., depending upon the positions on the monitor screen at which image data picked up with the devices, are to be displayed. Specifically, the drive signals $\Phi V1$ to $\Phi V4$ for the line-shifts drive the solid state image pickup devices (1, 2) 1-2a and 1-2b from the start point of the effective vertical scan period, and drive the solid state image pickup devices (3, 4) 1-2c and 1-2d from the middle point of the effective vertical scan period. The drive signals $\Phi H1$ to $\Phi H2$ for the horizontal readout drive the solid state image pickup devices (1, 3) 1-2a and 1-2c from the start point of the effective horizontal scan period, and drive the solid state image pickup devices (2, 4) 1-2b and 1-2d from the middle point of the effective horizontal scan period.

Figure 6A:
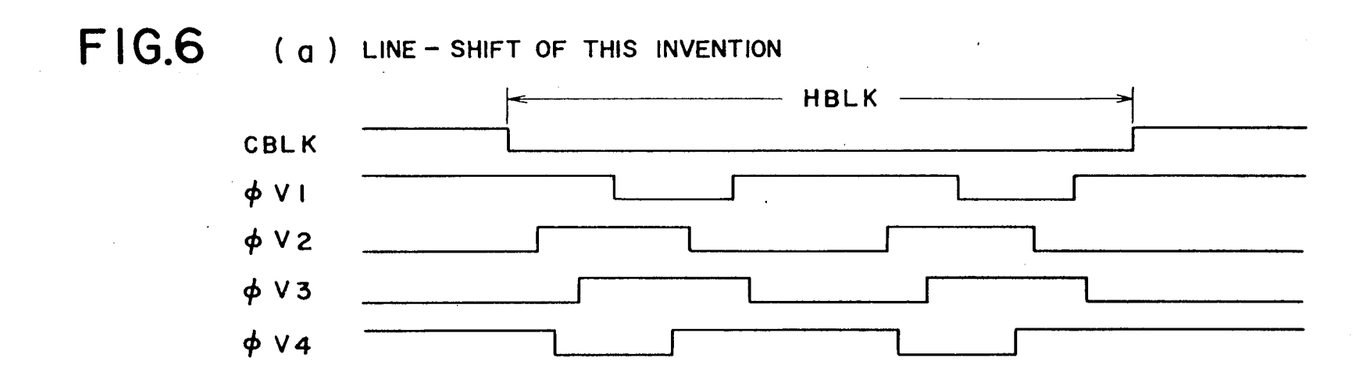
FIGS. 6a, 6b, and 7a to 7c are timing charts showing the vertical and horizontal drive timings and comparing the embodiment of this invention with the related background art of this invention.
Figure 6B:
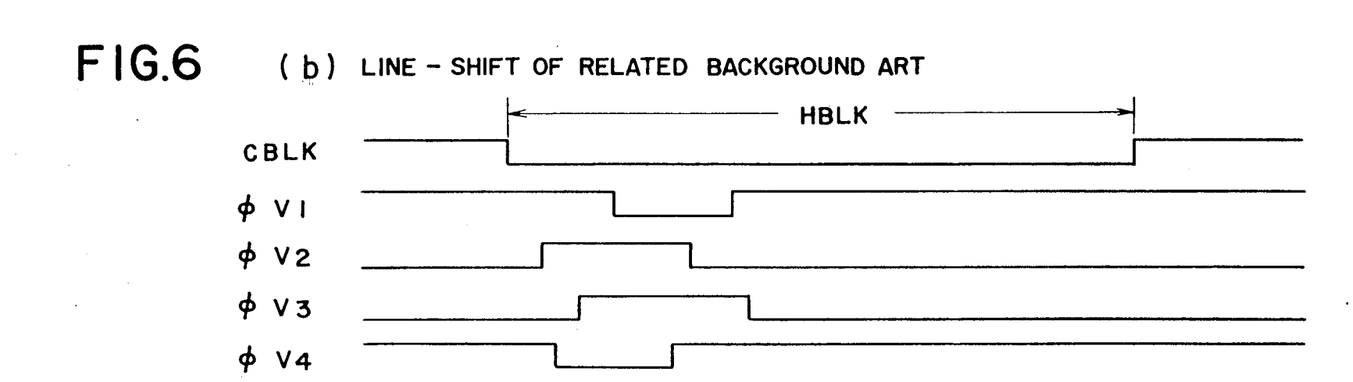
Figure 7A:
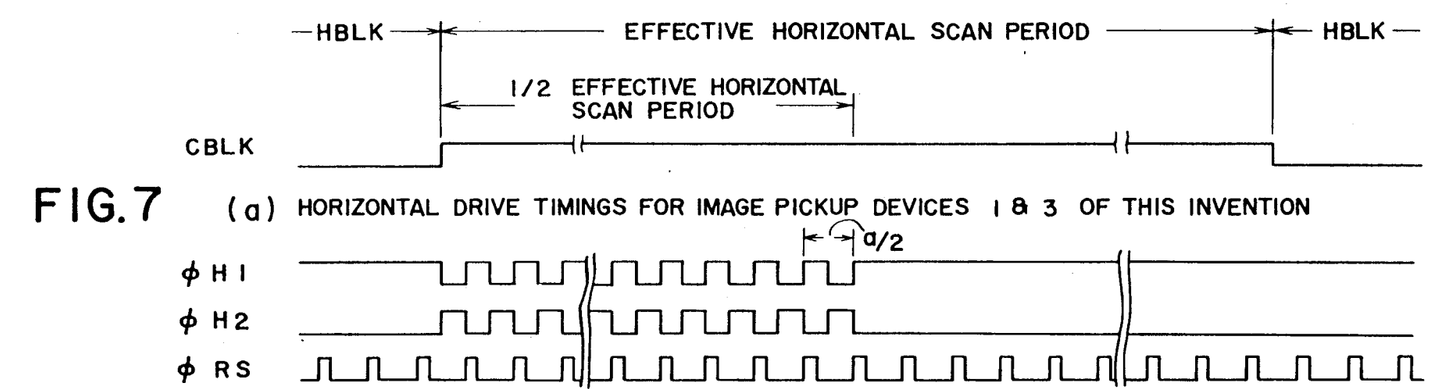
Figure 7B:
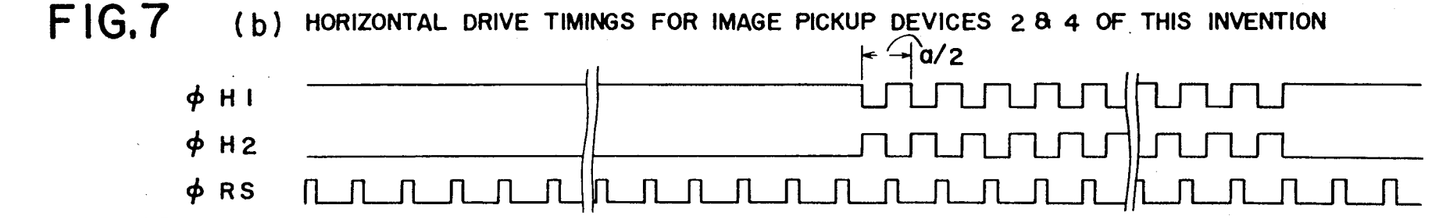
Figure 7C:
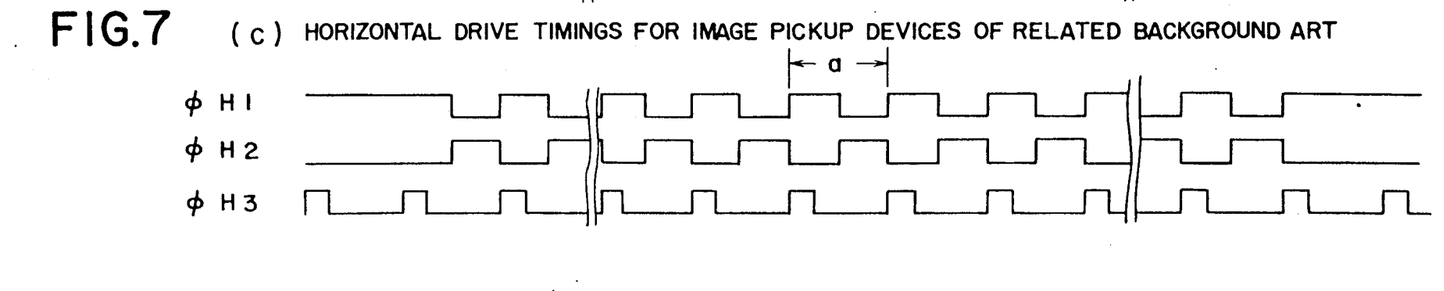

The above-described drive timings will be described in more detail with reference to FIGS. 6 and 7 showing the detail of parts of FIGS. 4 and 5. FIGS. 6(a) and 6(b) show the portions surrounded by broken lines 6(a) in FIG. 4 and 6(b) in FIG. 5, respectively. FIGS. 7(a), 7(b) and 7(c) show the portions surrounded by broken lines 7(a) and 7(b) in FIG. 4, and 7(c) in FIG. 5, respectively. FIGS. 6(a) and 6(b) are disposed one upon another in a single sheet for the purpose of comparing the vertical drive timings of this invention with those of the above related background art. As seen from FIG. 6, according to the above related background art, line-shift for one line is carried out during one HBLK period, whereas according to the embodiment of this invention, line-shifts for two lines are carried out, i.e., two lines are added and read out. Therefore, as described previously, the time required for all the line-shifts becomes half that of the above related background art. FIGS. 7(a) to 7(c) are timing charts for the purpose of comparing the horizontal drive timings of the embodiment of the present invention with those of the above related background art. As seen from FIG. 7, the period of the horizontal drive signals is for the above related background art, whereas the period is a/2 for the embodiment of this invention. Namely, in the embodiment of this invention, the horizontal readout is carried out at a speed twice as fast as that of the above related background art. In addition, in the embodiment of this invention, the solid state image pickup devices (1, 3) 1-2a and 1-2c are horizontally driven at the front half of the effective horizontal scan period, and the solid state image pickup devices (2, 4) 1-2b and 1-2d are horizontally driven at the back half of the effective horizontal scan period.

The description of the above embodiment will be summarized as follows. In each of the solid state image pickup devices (1 to 4) 1-2a to 1-2d, two lines of signals are added up and read out (line-shift), and in the horizontal direction read out at a speed twice as fast as that of the above-related background art. The timings in the vertical and horizontal directions are shown in the table below.

TABLE

| Image Pickup Device | Line-shift Start Timings | Horizontal Drive Start Timings |
|---|---|---|
| (1)1-2a | Start Point of Effective Vertical Scan Period | Start Point of Effective Horizontal Scan Period |
| (2)1-2b | Start Point of Effective Vertical Scan Period | Middle Point of Effective Horizontal Scan Period |
| (3)1-2c | Middle Point of Effective Vertical Scan Period | Start Point of Effective Horizontal Scan Period |
| (4)1-2d | Middle Point of Effective Vertical Scan Period | Middle Point of Effective Horizontal Scan Period |

Following the above procedure, the image 1-6 shown in FIG. 1 is eventually obtained.

The above embodiment has been described in connection with a method of displaying four sub-frame images on an NTSC system monochrome TV monitor. However, it is obvious that the present invention is also applicable to the PAL system, SECAM system and the like.

The above embodiment of this invention has the following advantageous effects.

(1) In the apparatus according to the embodiment of this invention, different from the method of sampling pixels according to the above related background art, pixels are not sampled but read out at a higher speed. Therefore, the horizontal resolution of the embodiment is not degraded but improved by (number of sub-frames in the horizontal direction) times when compared with that of the above related background art. For example, in the case of four sub-frames having two sub-frames in the horizontal direction shown in FIG. 1, the horizontal resolution of an image within a sub-frame is improved two times when compared with that of the above related background art.

(2) It is necessary for the above related background art to use A/D converters, RAMs and D/A converters requiring highly sophisticated technology, resulting in bulky and expensive circuits and system. Contrary to the above, according to the embodiment of this invention, sophisticated A/D converters and the like are not needed, and the embodiment apparatus can be realized with only slight modification of the drive circuit for solid state image pickup devices and a signal processing circuit for processing signals from the devices, respectively mounted within a conventional TV camera. Therefore, the overall system becomes compact when compared with the above related background art system. Furthermore, the cost effectiveness of the system is enhanced because sophisticated A/D converters and the like are not needed.

What is claimed is:

1. A method of displaying sub-frame images for a television system wherein image pickup signals are read out from a plurality of image pickup devices using vertical direction signal readout means and horizontal direction signal readout means, and a plurality of images picked up with the plurality of image pickup devices are reduced in size by processing the image pickup signals to display the reduced images on the screen of a single television monitor at the same time, comprising the steps of:

reading out said image signals of a predetermined number n of lines at the same time by using said vertical direction signal readout means, where n is a number larger than or equal to 1;

reading said image signals at a high speed within a period of one m-th of an effective horizontal scan period, by using said horizontal direction signal readout means, where m is a number larger than or equal to 1; and determining the start timings for reading said image pickup signals from each of said image pickup devices in the vertical and horizontal directions, by using timing determining means, depending upon at which position on said display screen each said image picked up with each said image pickup device is to be displayed.

2. A method according to claim 1, wherein said n is 1, and said m is larger than 1 and not inclusive of 1.

3. A method according to claim 1, wherein said n is larger than or equal to 2, and said m is 1.

4. A method according to claim 1, wherein said n is larger than or equal to 2, and m is larger than and not inclusive of 1.

5. A method according to claim 1, wherein said n and m are the same.

6. A method according to claim 1, wherein said n and m are different.

7. An apparatus for displaying subframe images for a television system wherein image pickup signals are read out from a plurality of image pickup devices using vertical direction signal readout means and horizontal direction signal readout means, and a plurality of images picked up with the plurality of image pickup devices are reduced in size by processing the image pickup signals to display the reduced images on the screen of a single television monitor at the same time, and wherein:

said vertical direction signal readout means is constructed so as to add up and read out said image signals of a predetermined number n of lines at the same time, where n is a number larger than or equal to 1;

said horizontal direction image readout means is constructed so as to read said image signals at a high speed within a period of one m-th of an effective horizontal scan period, where m is a number larger than or equal to 1; and timing determining means is provided for determining the start timings of reading said image pickup signals from each of said image pickup devices in the vertical and horizontal directions, depending upon at which position on said display screen each said image picked up with each said solid state image pickup device is to be displayed.

8. A method according to claim 1, wherein said m is 1, and said n is larger than 1 and not inclusive of 1.

* * * * *